April 17, 1973 D. M. HEINZ 3,728,153

METHOD OF FORMING BUBBLE DOMAIN SYSTEM

Filed Dec. 21, 1970

INVENTOR
DAVID M. HEINZ
BY
Joseph E. Kieninger
ATTORNEY

United States Patent Office 3,728,153

Patented Apr. 17, 1973

3,728,153
METHOD OF FORMING BUBBLE DOMAIN SYSTEM

David M. Heinz, Orange, Calif., assignor to North American Rockwell Corporation, El Segundo, Calif.

Filed Dec. 21, 1970, Ser. No. 100,230
Int. Cl. H01f *10/02*
U.S. Cl. 117—239 3 Claims

ABSTRACT OF THE DISCLOSURE

A method of forming a bubble domain system of magnetic material having a portion containing small diameter bubble domains and an adjacent portion having larger diameter bubble domains is disclosed. The method includes the step of providing a first single crystal magnetic film having a small bubble domain diameters therein and the further step of depositing a single crystal magnetic film having a lower magnetization level on a specific portion of said first film. The structure formed by this method has large diameter bubble domains in the portion having both of the films and small diameter bubbles in the portion having only one film.

BACKGROUND OF THE INVENTION

(1) Field of the invention

Figure 1:
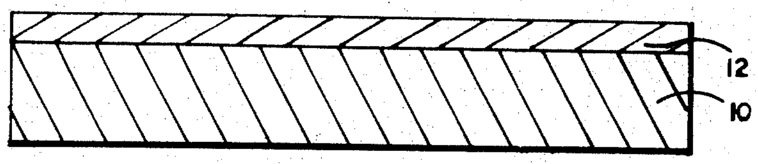

This invention relates to a method of forming a bubble domain system and more particularly to a method of forming a bubble domain system having at least two portions having a different diameter size bubble domains therein.

(2) Description of prior art

Early work in the bubble domain research such as that described in the U.S. Pat. No. 3,460,116 was done primarily with orthoferrites having a diameter of about 0.0015 inch. The relatively large diameter of the bubble domains permitted their generation and detection to be performed by means that are now well established in the literature. More recent work has shown the feasibility of using iron garnets for bubble domain devices. Bubble domain structures having an iron garnet films, $J_3Q_5O_{12}$, where J is a rare earth element or yttrium and Q contains iron as described in the copending applications Ser. Nos. 16,446 and now U.S. Pat. No. 3,645,788 and 16,447, both filed Mar. 4, 1970; U.S. Ser. Nos. 101,786; 101,785; and 101,787 all filed Dec. 28, 1970. which are incorporated herewith. The bubble domains in iron garnets have a smaller diameter than those in orthoferrites, thereby providing a bubble domain density in iron garnets of over a million per square inch. The diameter of the bubble domains in the rare earth iron garnets is about 0.00025 inch. The small size of the iron garnet bubble domains makes it difficult to generate and detect the bubble domains in bubble domain systems.

In particular, current-loop bubble-splitters presently available to generate bubble domains having a diameter size of 0.0015 inch cannot be satisfactorily used to generate small bubble domains having a diameter size of 0.00025 inch because of the limits imposed by photolithographic resolution and the thickness of the conductor required to carry the current. Also, the output signal from a Hall effect device used for bubble detection is dependent on the area exposed to reverse-magnetized domains. As a result, bubble domains having a small diameter have a corresponding small area that produces a small detection signal which makes detection of the small bubble domain difficult.

Bubble domain systems of magnetic material having a portion containing a small diameter bubble domain and an adjacent portion having larger bubble domains are described in detail in the copending application to Heinz, U.S. Ser. No. 99,937, which is incorporated herewith by reference thereto. In this bubble domain system there are portions of the structure suitable for generating large diameter bubble domains and for propagating small diameter bubble domains and for detecting large diameter bubble domains.

SUMMARY OF THE INVENTION

It is the primary object of this invention to provide an improved method of forming a bubble domain system.

It is another object of this invention to provide a method of forming a bubble domain system having regions of small buble domains and regions of large bubble domains.

It is still another object of this invention to provide a method of forming a bubble domain system having a high bubble domain density suitable for propagation and having a bubble domain size suitable for generation and/or detection.

These and other objects of this invention are accomplished by a method which includes providing a first film of a single crystal magnetic material having relatively small bubble domains therein and a further step of depositing a second single crystal magnetic film having a lower magnetization level on a specific portion of the first film, to provide a portion having relatively large diameter bubble domains.

Other objects and advantages will be apparent from the following detailed description, reference being made to the accompanying drawings wherein a preferred embodiment of this invention is shown:

IN THE DRAWINGS

Figure 1A:
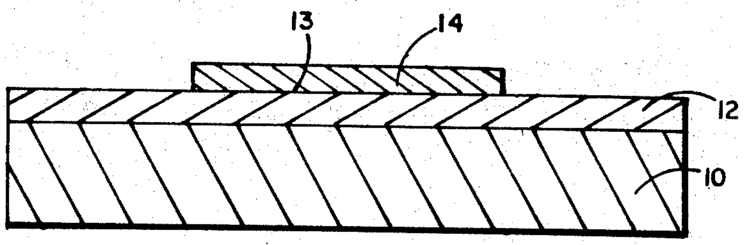
Figure 1B:
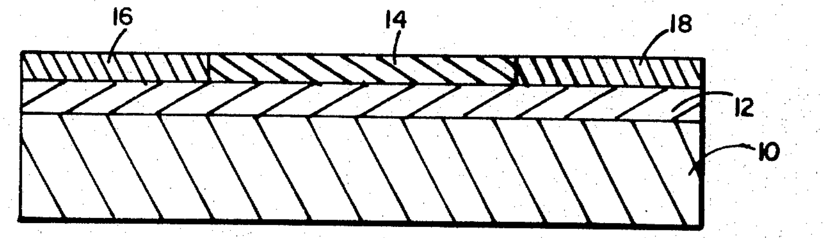
Figure 1C:
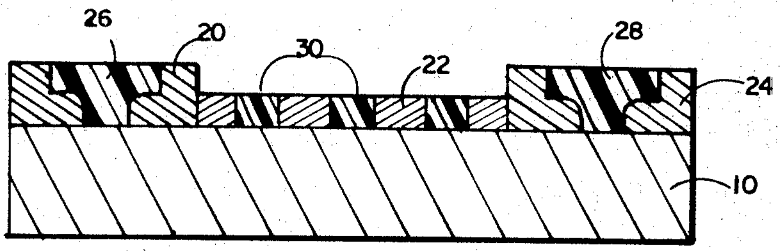

FIGS 1–1*c* are cross-sectional views of the structure formed in accordance with this invention.

Figure 2:
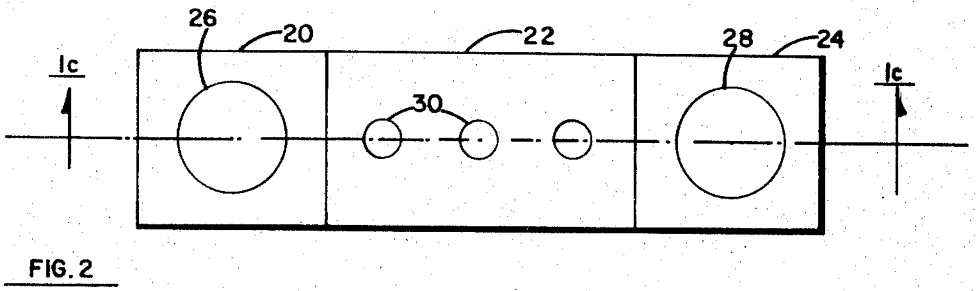

FIG. 2 is a top view.

DETAILED DESCRIPTION OF AN ILLUSTRATIVE EMBODIMENT

As shown in FIG. 1, a monocrystalline substrate 10 has a thin film of magnetic bubble domain material 12 thereon.

The substrate 10 is a monocrystalline material having a $J_3Q_5O_{12}$ formulation wherein the J constituent of the wafer formulation is at least one element selected from the group consisting of cerium, praseodymium, neodymium, promethium, samarium, europium, gadolinium, terbium, dysprosium, holmium, erbium, thulium, ytterbium, lutetium, lanthanum, yttrium, calcium, bismuth; and the Q constituent of the wafer formultion is at least one element selected from the group consisting of indium, gallium, scandium, titanium, vanadium, chromium, manganese, rhodium, zirconium, hafnium, niobium, tantalum, and aluminum.

Examples of preferred substrate materials are $$Gd_3Ga_5O_{12},$$

$Gd_{2.7}Y_{0.3}Ga_5O_{12}$ and $Y_3Al_5O_{12}$.

The film of bubble domain material is a film having a JQ-oxide formulation wherein the J constituent of the film formulation has a least one element selected from the group of cerium, praseodymium, neodymium, promethium, samarium, europium, gadolinium, terbium, dysprosium, holmium, erbium, thulium, ytterbium, lanthanum and yttrium; the Q constituent of the film formulation is taken from the group consisting of iron, iron and aluminum, iron and gallium, iron and indium, iron and scandium, iron and titanium, iron and vanadium, iron and chromium, and iron and manganese.

Examples of preferred film materials are $$Y_3Ga_{1.2}Fe_{3.8}O_{12}$$

and $Y_3Ga_{1.1}Fe_{3.9}O_{12}$.

A preferred composite film-substrate structure has an iron garnet film with a given magnetostriction constant and a given difference between the lattice constants of the film and substrate. This requirement is discussed in detail in the copending patent applications U.S. Ser. Nos. 101,786; 101,785 and 101,787 all filed Dec. 28, 1970 by Mee et al. which are incorporated herewith by reference thereto.

As shown in FIG. 1*a*, a mask 14 of a material such as silicon dioxide and the like is deposited on portion 13 of the magnetic film 12.

As shown in FIG. 1*b*, a single crystal magnetic material is deposited on the unmasked portion of film 12 to form film portions 16 and 18 adjacent to mask 14. A preferred example is the combination of film 12 of $Y_3Ga_{1.2}Fe_{3.8}O_{12}$ and a film of $Y_3Ga_{1.3}Fe_{3.7}O_{12}$ for portions 16 and 18. Portions 16 and 18 in this example contain less iron than film 12 and, as a result, have a lower magnetization level.

As shown in FIG. 1*c*, the mask layer 14 is removed. The resultant structure has a composite film 20 made of film 12 and film 16, a film portion 22, and a composite film portion 24 made of film 12 and film 18. Composite films 20 and 24 have a lower magnetization level than that of film portion 22. The bubble domains 26 and 28 formed in the film portions 20 and 24, respectively, have a larger diameter at the surface than the bubble domains 30 formed in film portion 22. The bubble domain 26 in composite film portion 20 extends through the entire portion. Similarly, the bubble domain 28 in the composite film portion 24 extends throughout the composite. Bubble domains 26 and 28 in composite film portions 20 and 24, respectively, are of relatively large diameter at the surface and well suited for the generation and detection of bubble domains. The bubble domain portion 22 having bubble domains 30 of smaller diameter is well suited for propagation purposes and for having a high bubble domain density.

FIG. 2 is a top view showing the relative size of the diameter of the bubble domains in the various film portions.

What is claimed is:

1. A method of forming a bubble domain system having a film of a first single crystal magnetic bubble domain material on a single crystal substrate comprising the step of forming a film of a second single crystal magnetic bubble domain material having a lower level of magnetization than said first magnetic bubble domain material on top of a portion of said film of said first single crystal magnetic bubble domain material.

2. A method of forming a bubble domain system having a film of a first single crystal magnetic bubble domain material on a single crystal substrate comprising the step of chemically vapor depositing a film of a second single crystal magnetic bubble domain material having a lower level of magnetization than said first magnetic bubble domain material on top of said first material.

3. A method as described in claim 2 including the step of providing a mask on a portion of said first magnetic bubble domain material prior to the deposition of said second magnetic bubble domain material.

References Cited

UNITED STATES PATENTS

| | | | |
|---|---|---|---|
| 3,645,788 | 2/1972 | Mee et al. | 117—235 |
| 3,540,019 | 11/1970 | Bobeck et al. | 340—174 |
| 3,530,444 | 9/1970 | Bobeck et al. | 340—174 |
| 3,603,939 | 9/1971 | Bobeck et al. | 340—174 |
| 3,617,381 | 11/1971 | Hanak | 117—235 |
| 3,479,156 | 11/1969 | Ginder | 117—239 |
| 3,396,047 | 8/1968 | Prosen | 117—239 |
| 3,574,679 | 4/1971 | Pulliam et al. | 117—239 |
| 3,573,099 | 3/1971 | Moore et al. | 117—235 |

OTHER REFERENCES

Giess et al.: IBM Tech. Dis. Bull., pp. 517, 340–174, Ortho, vol. 13, No. 2, July 1970.

Roosol: Journal of Applied Physics, vol. 39, October 1968, pp. 5263–5267.

WILLIAM D. MARTIN, Primary Examiner

B. D. PIANALTO, Assistant Examiner

U.S. Cl. X.R.

117—106 R; 340—174 M, 174 TF